(12) United States Patent
Kawanami et al.

(10) Patent No.: US 8,474,893 B2
(45) Date of Patent: Jul. 2, 2013

(54) GRASPING APPARATUS

(75) Inventors: Yasunori Kawanami, Tokyo (JP);
Akichika Tanaka, Chiba (JP);
Kenichiro Nagasaka, Tokyo (JP);
Masakuni Nagano, Chiba (JP)

(73) Assignee: Sony Corporation, Tokyo (JP)

( * ) Notice: Subject to any disclaimer, the term of this patent is extended or adjusted under 35 U.S.C. 154(b) by 205 days.

(21) Appl. No.: 12/899,025

(22) Filed: Oct. 6, 2010

(65) Prior Publication Data
US 2011/0156416 A1 Jun. 30, 2011

(30) Foreign Application Priority Data
Dec. 25, 2009 (JP) .................................. 2009-293796

(51) Int. Cl.
*B66C 1/42* (2006.01)
(52) U.S. Cl.
USPC .......................................... 294/106; 294/198
(58) Field of Classification Search
USPC ...... 294/106, 111, 907, 103.1, 110.1; 901/29, 901/31, 37, 39
See application file for complete search history.

(56) References Cited

U.S. PATENT DOCUMENTS

| | | | | |
|---|---|---|---|---|
| 3,139,302 A * | 6/1964 | Orloff et al. | ................... | 294/198 |
| 3,952,880 A * | 4/1976 | Hill et al. | ........................... | 414/5 |
| 4,303,269 A * | 12/1981 | Faughnan | ..................... | 294/198 |
| 4,350,381 A * | 9/1982 | Hellmann | ..................... | 294/208 |
| 4,368,913 A * | 1/1983 | Brockmann et al. | .......... | 294/106 |
| 4,377,305 A * | 3/1983 | Horvath | ........................ | 294/106 |
| 4,449,531 A * | 5/1984 | Cerwin et al. | ................. | 606/158 |
| 4,456,293 A * | 6/1984 | Panissidi | ........................ | 294/106 |
| 4,511,305 A * | 4/1985 | Kawai et al. | ................... | 414/735 |
| 4,600,357 A * | 7/1986 | Coules | ........................... | 414/730 |
| 4,623,183 A * | 11/1986 | Aomori | ........................ | 294/86.4 |
| 4,709,953 A * | 12/1987 | Sirota | ............................ | 294/106 |
| 4,955,652 A * | 9/1990 | Brugere et al. | ................ | 294/106 |
| 5,378,033 A * | 1/1995 | Guo et al. | ...................... | 294/116 |
| 5,863,086 A * | 1/1999 | Christenson | ................... | 294/106 |
| 8,191,947 B2 * | 6/2012 | Jouan De Kervanoael | ... | 294/106 |
| 2011/0115244 A1* | 5/2011 | Kamon et al. | ................. | 294/106 |

FOREIGN PATENT DOCUMENTS

| | | |
|---|---|---|
| JP | 2005-238400 | 9/2005 |
| JP | 2005-261535 | 9/2005 |
| JP | 2007-69286 | 3/2007 |
| JP | 2008-49456 | 3/2008 |
| JP | 2008-105116 | 5/2008 |

* cited by examiner

*Primary Examiner* — Paul T Chin
(74) *Attorney, Agent, or Firm* — Oblon, Spivak, McClelland, Maier & Neustadt, L.L.P.

(57) ABSTRACT

A grasping apparatus includes a base unit, left and right parallel links, and a driving unit that is housed in the base unit and drives the first link of the right parallel link and the first link of the left parallel link in the open/close direction. Each of the left and right parallel links has a first link attached pivotably in an open/close direction about a base shaft of the base unit, a second link attached pivotably in the open/close direction about an auxiliary shaft located on an outer side in the open/close direction, a finger unit supported pivotably at an end of the first link and an end of the second link, and a claw projecting toward the inner side in the open/close direction and disposed along an end face of the grasping surface of the finger unit of each of the left and right parallel links.

13 Claims, 13 Drawing Sheets

GRASPING APPARATUS

BACKGROUND OF THE INVENTION

1. Field of the Invention

The present invention relates to a grasping apparatus installed in, for example, a robot and used to transfer physical objects or assemble structural members and, more particularly, to a grasping apparatus that has a simple structure, can be driven by a small number of actuators, and is applicable to various physical objects.

2. Description of the Related Art

In recent years, research and development of robots have been actively performed mainly for the purpose of replacing human work. Many robots have grasping apparatuses in their hand units to transfer physical objects or assemble structural members.

The grasping apparatus has many joint degrees of freedom to perform complicated work. If the number of actuators for driving joints increases, however, the weight of the actuators and the frame supporting the actuators increase and the grasping apparatus becomes large-sized. The driving and control circuits and wiring for operating the actuators also increase in size with the number of the actuators, thereby making driving software complicated so as to synchronously control a plurality of joint shafts. Since a single actuator achieves only one degree of freedom such as rotation or parallel movement, many actuators are necessary to support various physical objects.

For example, Japanese Unexamined Patent Application Publication No. 2008-105116 proposes a two-fingered grasping robot hand having a blade spring and an actuator. Even when the torque of the actuator is 0, this robot hand can grasp a physical object using a spring force. However, the problem is that an inside force is generated at all times and grasping only in the pivotal direction is enabled.

In addition, for example, Japanese Unexamined Patent Application Publication No. 2008-49456 proposes a robot hand having one actuator, located at the base, that opens or closes the finger middle joint and finger base joint using a gear train to open or close the left and right fingers synchronously. However, a backlash occurs in this robot hand because power is transferred with the gear train. Another problem is that grasping is enabled only in the rotation direction of a link, which is equivalent to a finger.

In addition, for example, Japanese Unexamined Patent Application Publication No. 2007-69286 proposes a robot hand that synchronously opens or closes the left and right fingers using a differential gear and a wire via a pulley. However, one problem with this robot hand is the initial tension and the elongation of the wire itself because power is transferred by the wire. Another problem is a backlash or efficiencies because a bevel gear is used.

For example, Japanese Unexamined Patent Application Publications Nos. 2005-238400 and 2005-261535 propose grasping apparatuses that have two mutually facing fingers of a gripper, each of which includes parallel links. This type of grasping apparatus grasps a physical object by opening or closing the claws at the tip of the fingers with their grasping surfaces kept substantially parallel. Therefore, even when the physical object is box-shaped, the contact area between the claws and the physical object can be reserved sufficiently regardless of the size of the box.

SUMMARY OF THE INVENTION

It is desirable to provide a superior grasping apparatus installed in, for example, a robot and used to transfer physical objects or assemble structural members.

It is also desirable to provide a superior grasping apparatus that has a simple structure, can be driven by a small number of actuators, and is applicable to various physical objects.

According to a first embodiment of the present invention, there is provided a grasping apparatus including a base unit, left and right parallel links each including a first link attached pivotably in an open/close direction about a base shaft of the base unit, a second link attached pivotably in the open/close direction about an auxiliary shaft located on an outer side in the open/close direction than the base shaft of the base unit, a finger unit supported pivotably at an end of the first link and an end of the second link, and a claw that is projecting toward the inner side in the open/close direction and disposed along an end face of a grasping surface of the finger unit, the left and right parallel links being substantially symmetrical to each other, and a driving unit that is housed in the base unit and drives the first links of the right and left parallel link in the open/close direction.

According to a second embodiment of the present invention, the driving unit of the grasping apparatus according to the first embodiment includes an actuator and a transmission unit that evenly transmits rotation by the actuator to the basic shaft of each of the left and right parallel links. According to a third embodiment of the present invention, the transmission unit includes a gear train to which a non-backlash gear is applied in a final stage for driving the base shaft.

According to a fourth embodiment of the present invention, the finger unit and the claw of the grasping apparatus according to the first embodiment includes high molecular compounds such as a polyurethane material with a Shore A hardness of 70 to 90.

According to a fifth embodiment of the present invention, the grasping surface of each of the left and right finger units of the grasping apparatus according to the first embodiment has a stopper of copolymer foam of, for example, acrylic, polyurethane, and rubber.

According to a sixth embodiment of the present invention, each of the left and right parallel links of the grasping apparatus according to the first embodiment has a rotation area in which a tip of the finger unit draws a substantially arc path according to rotation of the first link and the second link and an approximately horizontal movement area in which motion of the tip of the finger unit can be approximated to be horizontal. According to a seventh embodiment of the present invention, a length of the approximately horizontal movement area is determined on the basis of a relationship between lengths of the first link and the second link and an allowable height within which the tip of the finger unit is allowed to move vertically in the approximately horizontal movement area.

According to an eighth embodiment of the present invention, the first link of each of the left and right parallel links of the grasping apparatus according to the first embodiment has a concave grasping surface on the inner side in the open/close direction. According to a ninth embodiment of the present invention, an inside claw projecting toward the inner side in the open/close direction is disposed along a lower edge of the grasping surface of the first link of each of the left and right parallel links. According to a tenth embodiment of the present invention, the inside claw includes high molecular compounds such as a polyurethane material with a Shore A hardness of 70 to 90. The grasping surface of the first link of each of the left and right parallel links includes a stopper of copolymer foam of, for example, acrylic, polyurethane, and rubber.

According to an eleventh embodiment of the present invention, the second link of each of the left and right parallel links of the grasping apparatus according to the first embodiment has a concave grasping surface on the outer side in the open/close direction.

According to a twelfth embodiment of the present invention, the grasping apparatus according to the first embodiment further includes a sensing means for sensing a grasping force applied to grasp a physical object using open/close operation of the left and right parallel links of the grasping apparatus.

According to the embodiments of the present invention, it is possible to provide a superior grasping apparatus that is installed in a robot and used to transfer physical objects or assemble structural members.

According to the embodiments of the present invention, it is possible to provide a superior grasping apparatus that has a simple structure, can be driven by a small number of actuators, and is applicable to various physical objects.

According to the first to third embodiments, the grasping apparatus can operate the left and right parallel links together using one power source. Therefore, the left and right parallel links can be synchronized mechanically. In addition, the grasping apparatus has a simple structure including a small number of components, so the production cost is low. In addition, since there are less spatial limitations, increasing the rigidity of components improves MTBF (mean time between failure) and the tips of the left and right finger units move in the single path, making positioning control unnecessary and enabling accurate operation. In addition, the grasping apparatus can grasp not only a light object, but also a heavy object with the maximum weight within the range in which the power source can hold its output power because of its simple structure and high rigidity.

According to the first to third embodiments, a claw projecting toward the inner side is disposed along the front edge of the grasping surface of each of the left and right finger units, so a coin, card, hair pin, or another thin object on a floor can preferably be grasped.

According to the fourth embodiment, the left and right finger units and the claws disposed along the front edges of the left and right finger units have flexibility and durability, stabilize grasping, and solve security problems.

According to the fifth embodiment, combination of a spongy stopper on the grasping surface and the claw at the tip of the finger unit achieves high grasping performance.

According to the sixth and seventh embodiments, translational driving and rotary driving enable various grasping methods. One of these methods may be applied depending on the shape and size of a physical object to be grasped.

According to the eighth to tenth embodiments, the first link of each of the left and right parallel links has a concave grasping surface on the inner side in the open/close direction, so a relatively large object can be grasped safely by both concave portions.

According to the twelfth embodiment, the grasping force for grasping the object can be sensed by using open/close operation of the left and right parallel links.

Another purposes, characteristics, and advantages of the embodiments of the present invention will be identified from the embodiments described later and detailed descriptions based on attached drawings.

DESCRIPTION OF THE PREFERRED EMBODIMENTS

An embodiment of the present invention will be described in detail with reference to the drawings. A grasping apparatus according to the embodiment of the present invention is applicable to, for example, the hand unit of a robot arm. However, application of the embodiment of the present invention is not limited to a robot and purposes of the embodiment of the present invention are not limited to a particular robot, so the robot is not described in this specification.

Figure 1:
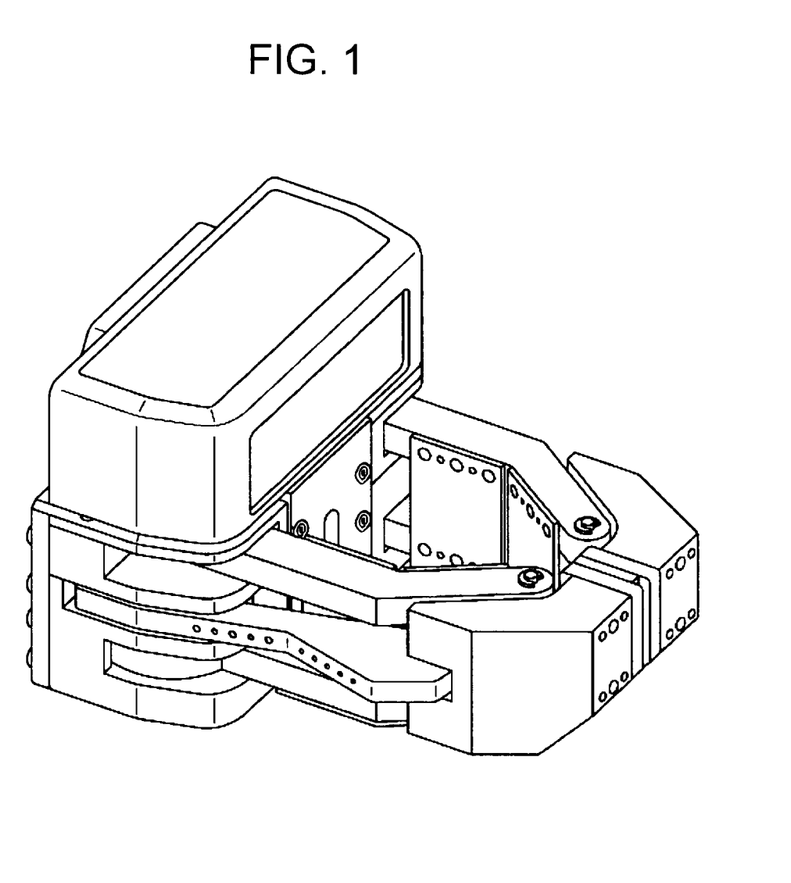
FIG. 1 is a perspective view showing an entire configuration of a grasping apparatus according to an embodiment of the present invention.
Figure 2:
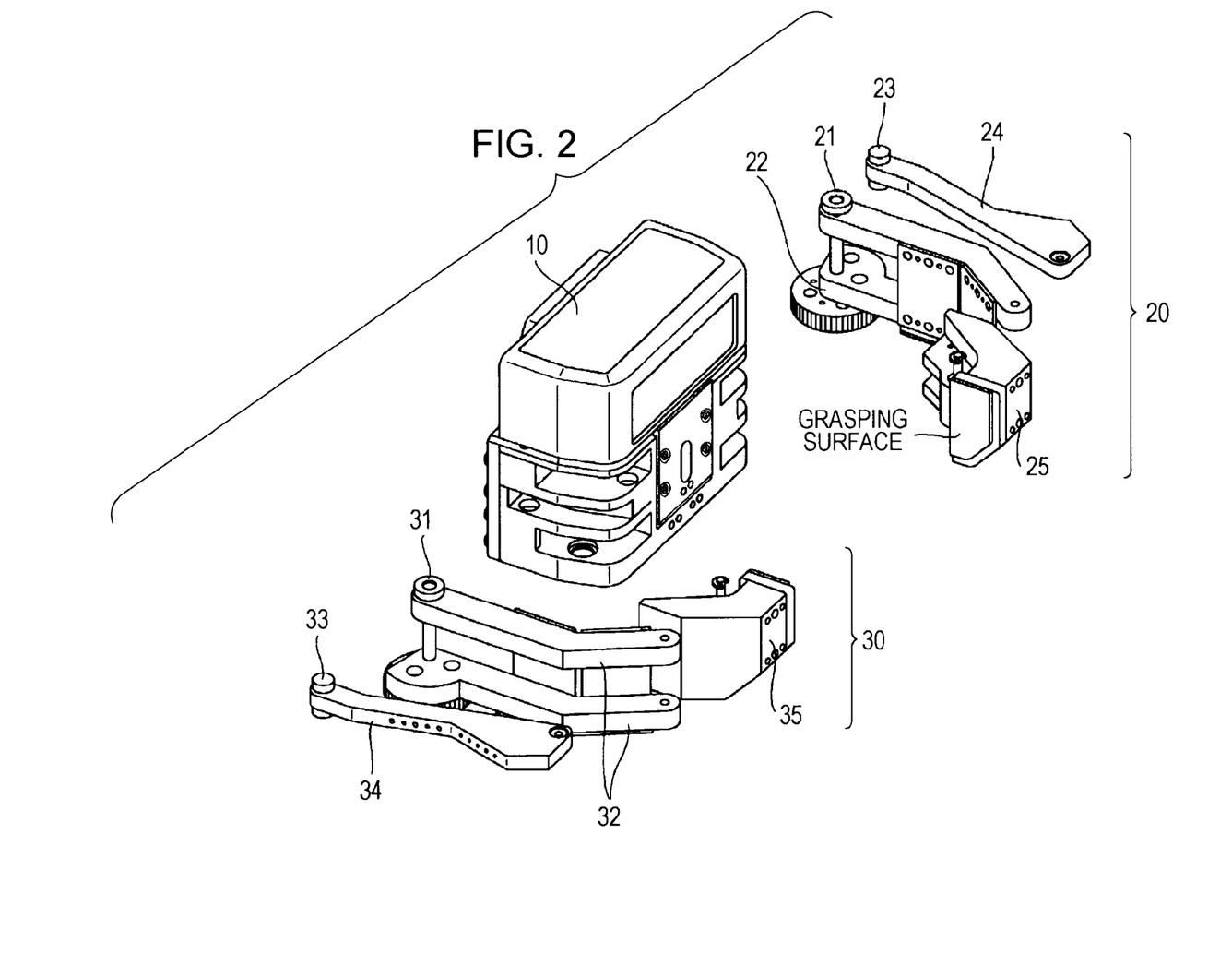
FIG. 2 is an exploded perspective view showing the grasping apparatus in FIG. 1, in which left and right parallel links are removed from a base unit.
Figure 3:
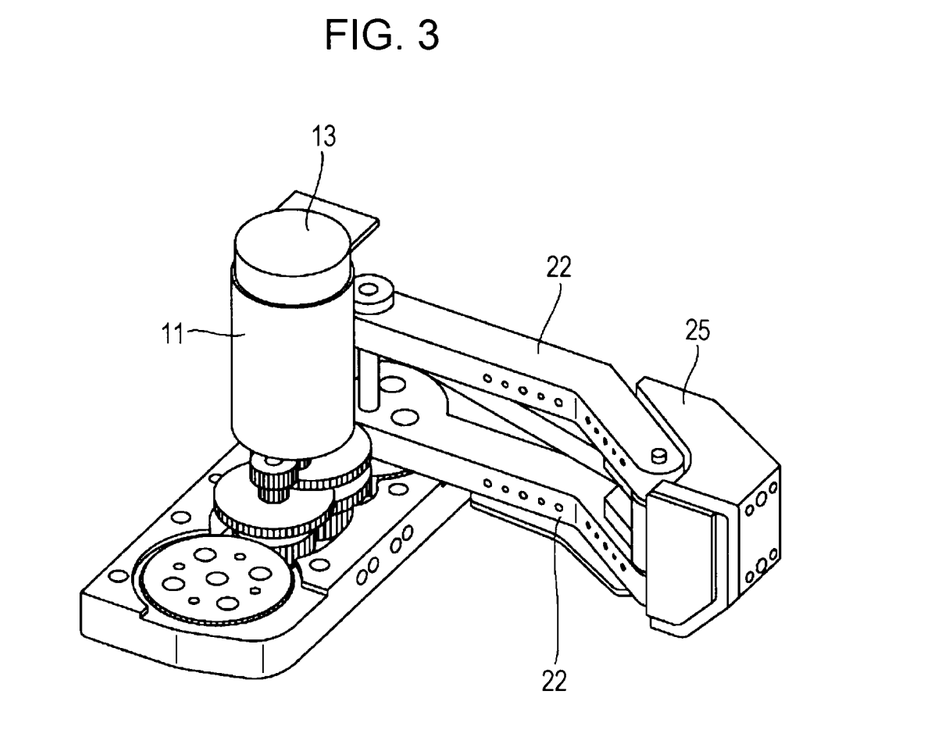
FIG. 3 is a perspective view showing the inside of the base unit of the grasping apparatus in FIG. 1.
Figure 4:
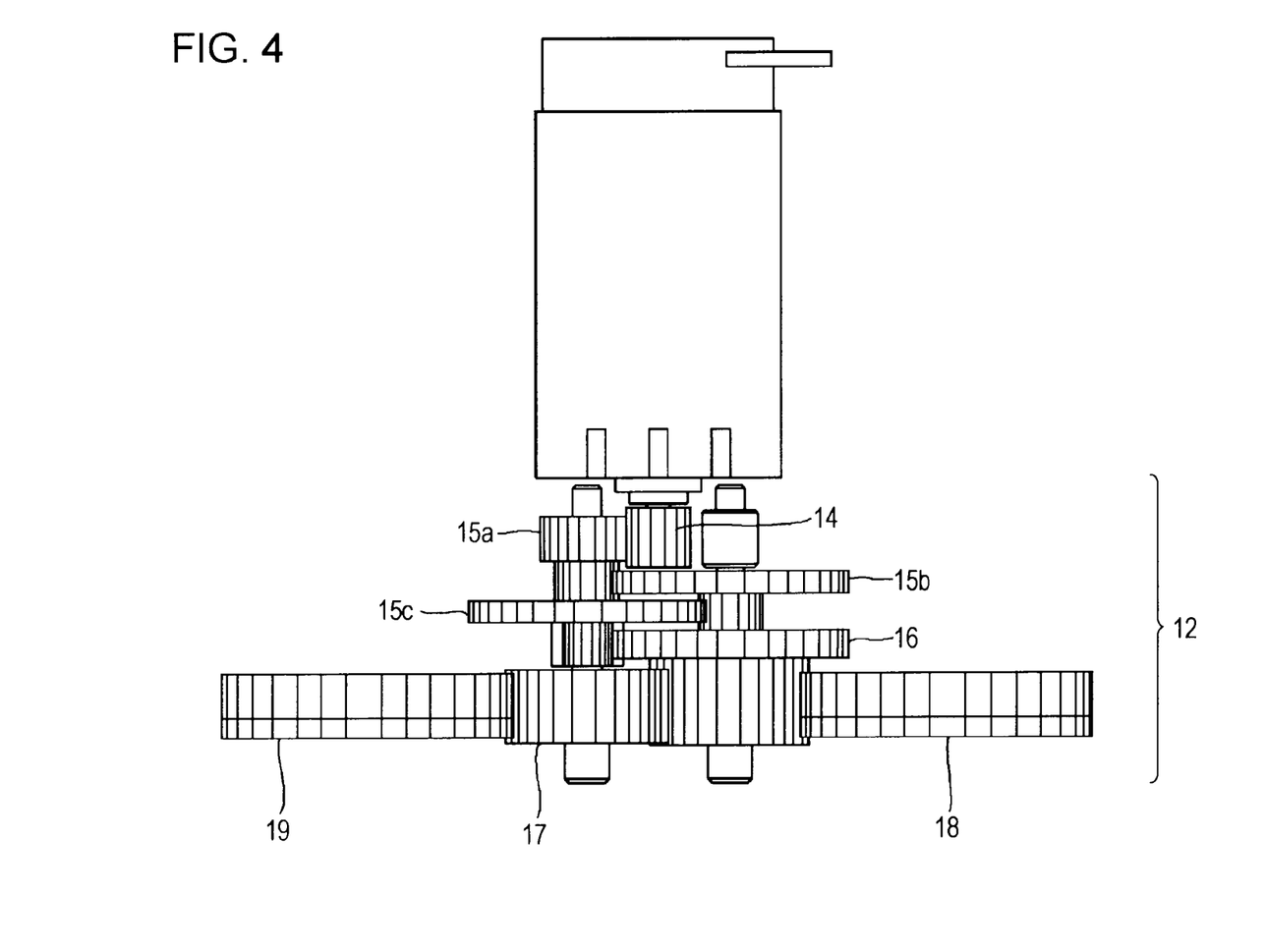
FIG. 4 is a side view showing a transmission unit housed in the base unit of the grasping apparatus in FIG. 1.
Figure 5:
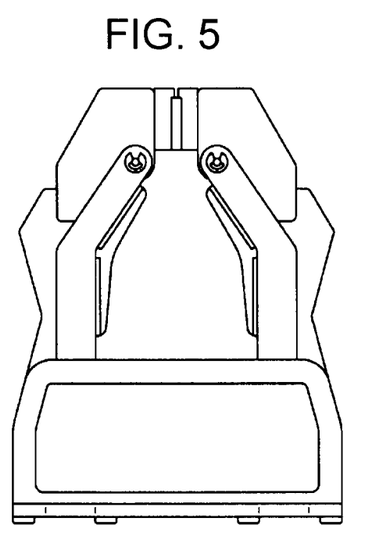
FIG. 5 is a top view showing the grasping apparatus in FIG. 1, in which the left and right parallel links are closed.
Figure 6:
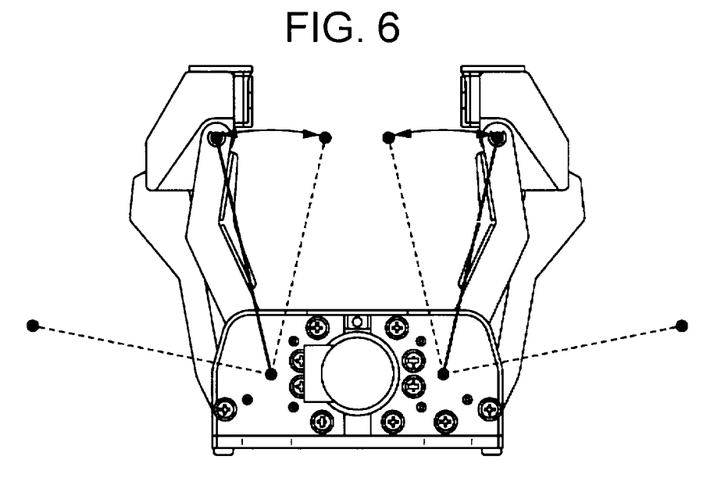
FIG. 6 is a top view showing the grasping apparatus in FIG. 1, in which the left and right parallel links are open.

First, the entire configuration of the grasping apparatus according to the embodiment of the present invention will be described with reference to FIG. 1. In a grasping apparatus 1 in FIG. 1, mutually facing left and right finger units of a gripper have parallel links. FIG. 1 is a perspective view showing the ejection of the grasping apparatus 1; FIG. 2 is an exploded perspective view, in which the left and right parallel links 20 and 30 are removed from a base unit 10; FIG. 3 is a perspective view of the inside of the base unit 10; FIG. 4 is a side view of a transmission unit 12 housed in the base unit 10; FIG. 5 is a top view of the grasping apparatus 1, in which the left and right parallel links 20 and 30 are closed; FIG. 6 is a top view of the grasping apparatus 1, in which the left and right parallel links 20 and 30 are open. In FIG. 6, the left and right parallel links 20 and 30 are open in an approximately horizontal movement area (described later); the left and right parallel links 20 and 30 can open at an angle of up to $\theta_{max}$ (described later), which is not shown in this figure.

As shown in FIG. 1, the grasping apparatus 1 includes the base unit 10 and the left and right parallel links 20 and 30 attached to the base unit 10.

As shown in FIG. 2, the left parallel link 20 includes a first link 22 attached pivotably in an open/close direction about a base shaft 21 to the base unit 10, a second link 24 attached pivotably in the open/close direction about an auxiliary shaft 23 located on an outer side in the open/close direction than the base shaft 21, and a finger unit 25 supported pivotably by the ends of the first link 22 and the second link 24. In the example shown in the figure, the first link 22 has two link members superimposed in the longitudinal direction of the base shaft 21 and the second link 24 has one link member inserted into the space between the two link members. The finger unit 25 has a grasping surface on an inner side in the open/close direction.

When the first link 22 pivots in the open/close direction about the base shaft 21, the second link 24 pivots in the open/close direction together about the auxiliary shaft 23. The parallelogram formed by the base unit 10, the first link 22, the second link 24, and the finger unit 25 is kept during the pivot operation, so the angle formed by the grasping surface of the finger unit 25 and the base unit 10 is constant.

The left parallel link 30 includes a first link 32 attached pivotably in the open/close direction about a base shaft 31 to the base unit 10, a second link 34 attached pivotably in the open/close direction about an auxiliary shaft 33 located on an outer side in the open/close direction than the base shaft 31, and a finger unit 35 supported pivotably by the ends of the first link 32 and the second link 34. In the example shown in the figure, the first link 32 has two link members superimposed in the longitudinal direction of the base shaft 31 and the second link 34 has one link member inserted into the space between the two link members. The finger unit 35 has a grasping surface on an inner side in the open/close direction.

When the first link 32 pivots in the open/close direction about the base shaft 31, the second link 34 pivots in the open/close direction together about the auxiliary shaft 33. The parallelogram formed by the base unit 10, the first link 32, the second link 34, and the finger unit 35 is kept during the pivot operation, so the angle formed by the grasping surface of the finger unit 35 and the base unit 10 is constant.

The left and right parallel links 20 and 30 are substantially symmetrical to each other. When the left and right first links 22 and 32 pivot in the open/close direction, the finger units 25 and 35 are displaced together in the open/close direction. At this time, the first links 22 and 32 pivot together with the second links 24 and 34, which are the other components of the parallel links 20 and 30, substantially symmetrically to each other. Therefore, as shown in FIG. 6, the grasping surfaces of the mutually facing finger units 25 and 35 are kept parallel to each other regardless of the positions of the parallel links 20 and 30.

The base unit 10 houses an actuator 11, which is used as a driving source for a motor, and the transmission unit 12, which includes a gear train for transmitting, with the same gear ratio (that is, for dividing the rotary output substantially evenly), the rotary output of the actuator 11 to the base shafts 21 and 31 (that is, the first links 22 and 32) of the left and right parallel links 20 and 30. The actuator 11 is assumed to have a motor and a reducer. A spur gear train, planetary gear, or wave gear reduction apparatus can be used as the reducer. The actuator 11 has an angle detection sensor 13 such as a rotary encoder.

Division of the rotary output of the actuator 11 into the parallel links 20 and 30 will be described with reference to mainly FIG. 4.

The rotation of the actuator 11 is reduced by engagement with a pinion gear 14, a second gear 15a, a third gear 15b, a fourth gear 15c, and a branch gear 16 in this order, these gears being attached to an output shaft of the actuator 11. The rotation direction of the branch gear 16 is identical to that of the pinion gear 14, which is identical to the rotation direction of the actuator 11.

A driven gear 18 is disposed rotatably about the base shaft 21 and engages with the branch gear 16; the rotation direction of the driven gear 18 is opposite to that of the branch gear 16, which is identical to the rotation direction of pinion gear 14. The driven gear 19 is disposed rotatably about the base shaft 31 and engages with a contrarotating idle gear 17. The contrarotating idle gear 17 engages with the branch gear 16 and the rotation direction of the driven gear 19 is identical to that of the branch gear 16, which is identical to the rotation direction of pinion gear 14. The driven gears 18 and 19 include non-backlash gears to transfer rotation without backlash.

The first link 22 of the left parallel link 20 is driven by the rotation of the driven gear 18 and the first link 32 of the right parallel link 30 is driven by the rotation of the driven gear 19. Therefore, when the actuator 11 is driven by rotation, the rotation output is divided via the transmission unit 12 to substantially symmetrically drive the left and right parallel links 20 and 30. When the left and right first links 22 and 32 pivot in the open/close direction, the finger units 25 and 35 are displaced together in the open/close direction. At this time, the first links 22 and 32 pivot together with the second links 24 and 34, which are the other components of the parallel links 20 and 30, substantially symmetrically to each other, so opening and closing are performed with the grasping surfaces on the inner sides of the finger units 25 and 35 kept substantially parallel to each other, as shown in FIGS. 5 and 6.

As described above, in the grasping apparatus 1 according to the embodiment, the actuator 11, which is one power source, can move the left and right parallel links 20 and 30 together. Therefore, the left and right parallel links 20 and 30 can be synchronized mechanically. The grasping apparatus 1 has a simple structure including a small number of components, so it can be manufactured at a low price. In addition, since there are less spatial limitations, increasing the rigidity of components improves MTBF (mean time between failure) and the tips of the finger units 25 and 35 move in the single path, making positioning control unnecessary and fast and enabling accurate operation. In addition, the grasping apparatus 1 can grasp not only a light object, but also a heavy object having the maximum weight within the range in which the actuator 11 can keep its output power because of its simple structure and high rigidity.

Next, the grasping operation of the grasping apparatus 1 according to the embodiment will be considered below.

When the finger units 25 and 35 of the parallel links 20 and 30 open or close as shown in FIGS. 5 and 6 to grasp a physical object on a floor, the finger units 25 and 35 mutually opened are brought into contact with the floor so as to clamp the physical object and then the finger units 25 and 35 are closed while sliding on the floor to grasp the physical object.

FIGS. 7A to 7E show how a thin object on a floor is grasped by the finger units 25 and 35 of the grasping apparatus 1. Examples of the thin object are a coin, card, hair pin, etc.

A claw projecting toward the inner side is disposed along the front edge of the grasping surface of each of the left and right finger units 25 and 35 in order to capture a thin and fine physical object. The claw projects toward the inner side in the open/close direction and its cross section has an acute angle of approximately 45 degrees. When the finger units 25 and 35 are closed, the acute claw tips enter the gap between the physical object and the floor, making it easy to grasp the physical object.

When the claw is made of metal, the physical object may be grasped only by the tips of the claws and the area of contact between the physical object and the claws is small, making the grasping state unstable. The hard and acute claw tip may also cause injury or other safety problems. Therefore, the left and right claws are made of polyurethane and are formed integrally with the finger units 25 and 35 in the present embodiment. Since polyurethane has a Shore A hardness of 70 to 90 and is more flexible than metal, it is more safe and secure. A claw with a Shore A hardness of 70 to 90 improves the flexibility and durability and covers a heavy object.

In the present embodiment, sponge stoppers are disposed on the grasping surfaces on the inner sides of the left and right finger units 25 and 35. Combination of the sponge stoppers on the grasping surfaces and the claws at the edges of the finger units 25 and 35 achieves high grasping performance. The sponge stoppers may be preferably special sponge whose fine bubbles function as many suction cups; an example of the sponge stopper is stopper rubber sheet STPES manufactured by MISUMI Corporation, which is copolymer foam of acrylic, polyurethane, and rubber.

Figure 7A:
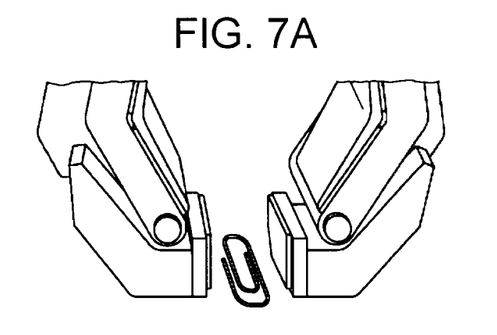
FIG. 7A shows how the grasping apparatus grasps a physical object on a floor.
Figure 7B:
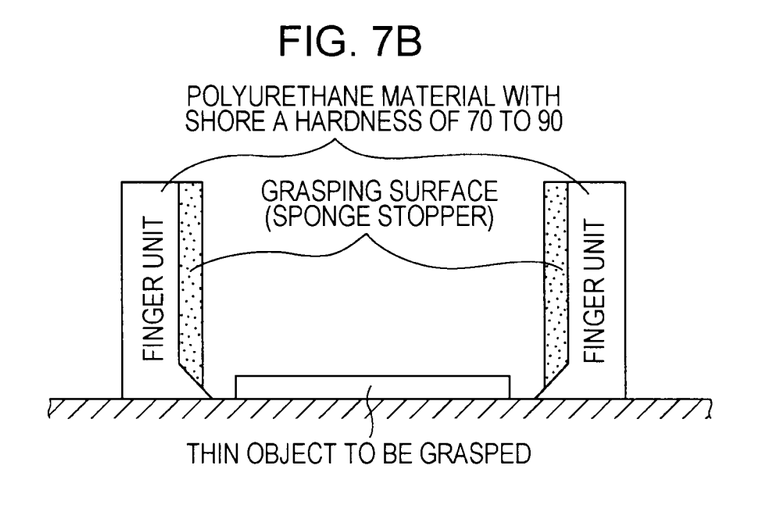
FIG. 7B shows how the grasping apparatus grasps a physical object on a floor.
Figure 7C:
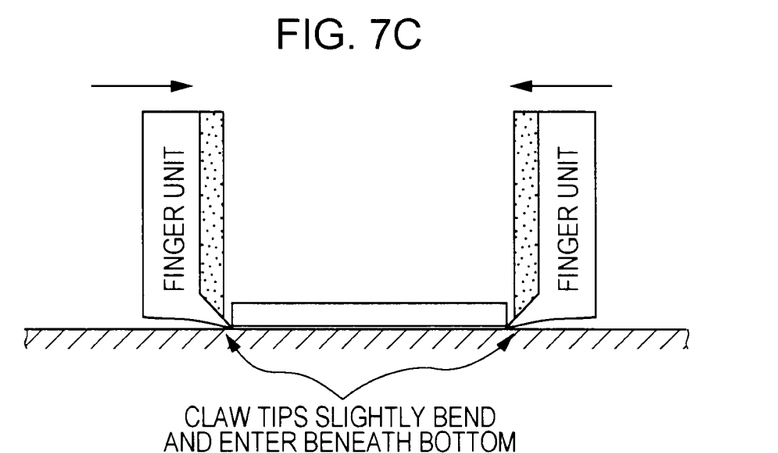
FIG. 7C shows how the grasping apparatus grasps a physical object on a floor.
Figure 7D:
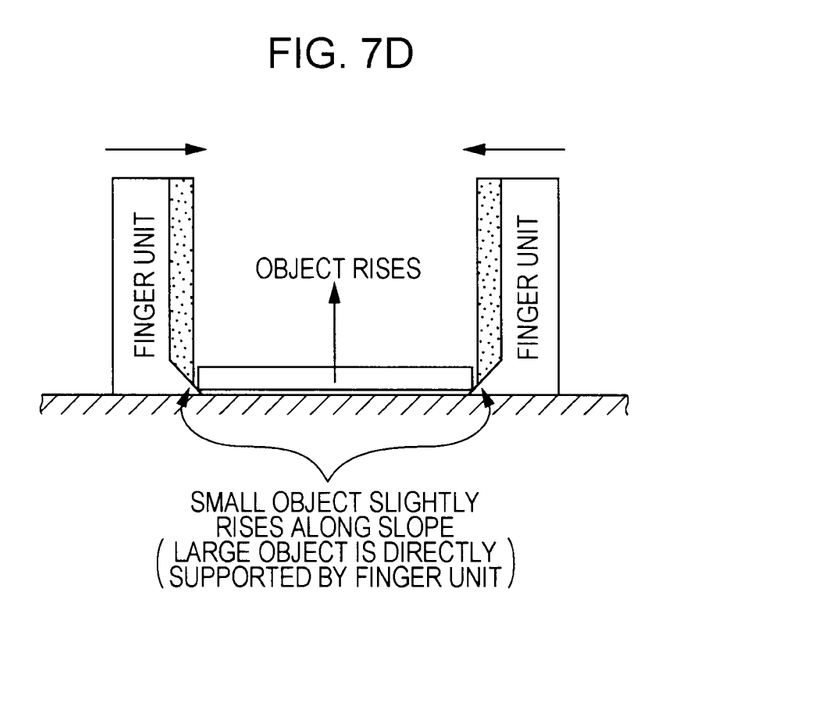
FIG. 7D shows how the grasping apparatus grasps a physical object on a floor.
Figure 7E:
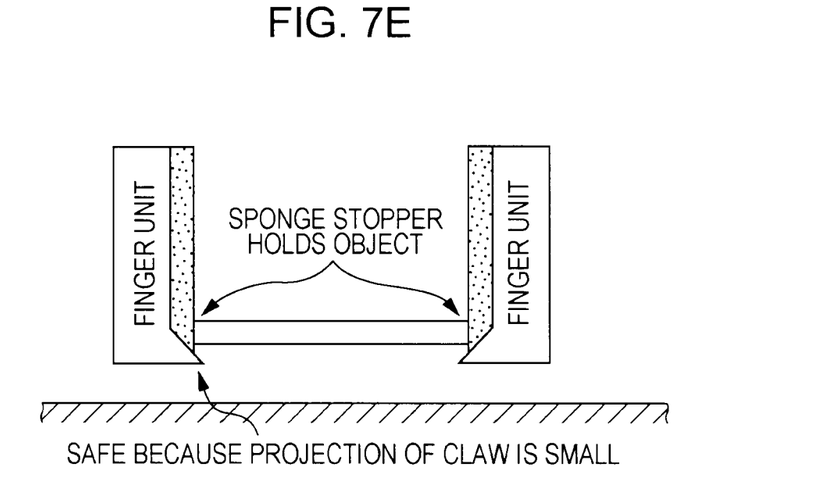
FIG. 7E shows how the grasping apparatus grasps a physical object on a floor.

As shown in FIG. 7B, the tips of the finger units 25 and 35 mutually opened are brought into contact with the floor so as to clamp the physical object and then the finger units 25 and 35 are closed while sliding on the floor to grasp the physical object. The tips of the left and right claws reach the bottom edges of the physical object and, as the finger units 25 and 35 further close, the tips of the claws slightly bend and enter beneath the bottom of the physical object as shown in FIG. 7C. If the size of the physical object to be grasped is small, the physical object slightly rises along the 45-degree slope of the claw as shown in FIG. 7D (however, if the physical object is large, the grasping surfaces inside the finger unit 25 and 35 can directly hold the physical object). When the left and right sides of the physical object make contact with the grasping surfaces having sponge stoppers, the physical object is securely grasped, so that it can be safely raised by the grasping surfaces inside the left and right finger units 25 and 35 as shown in FIG. 7E.

In the above (FIGS. 7A to 7E) grasping operation by the grasping apparatus 1, the floor is used as the compliance approach surface for control. In open/close operation of the finger units 25 and 35 shown in FIGS. 5 and 6, if finger tips move largely in the vertical direction (or in the longitudinal direction of the finger units), the position of the base unit 10 varies in the vertical direction accordingly. For example, when the grasping apparatus 1 is applied as an end effecter of an articulated arm, the wrist position varies vertically during such grasping operation. Therefore, not only the two finger units, but also the wrist position of the arm is to be controlled in grasping operation, so calculation becomes complicated. That is, in grasping operation, if variation of finger tips in the vertical direction is small enough to approximate the motion to be horizontal, only the two finger units are to be controlled by securing the wrist position of the articulated arm. Although the finger tips of the grasping apparatus 1 move in an arc path, calculation for control is simplified by enlarging the area that can be approximated to be linear movement.

Figure 8:
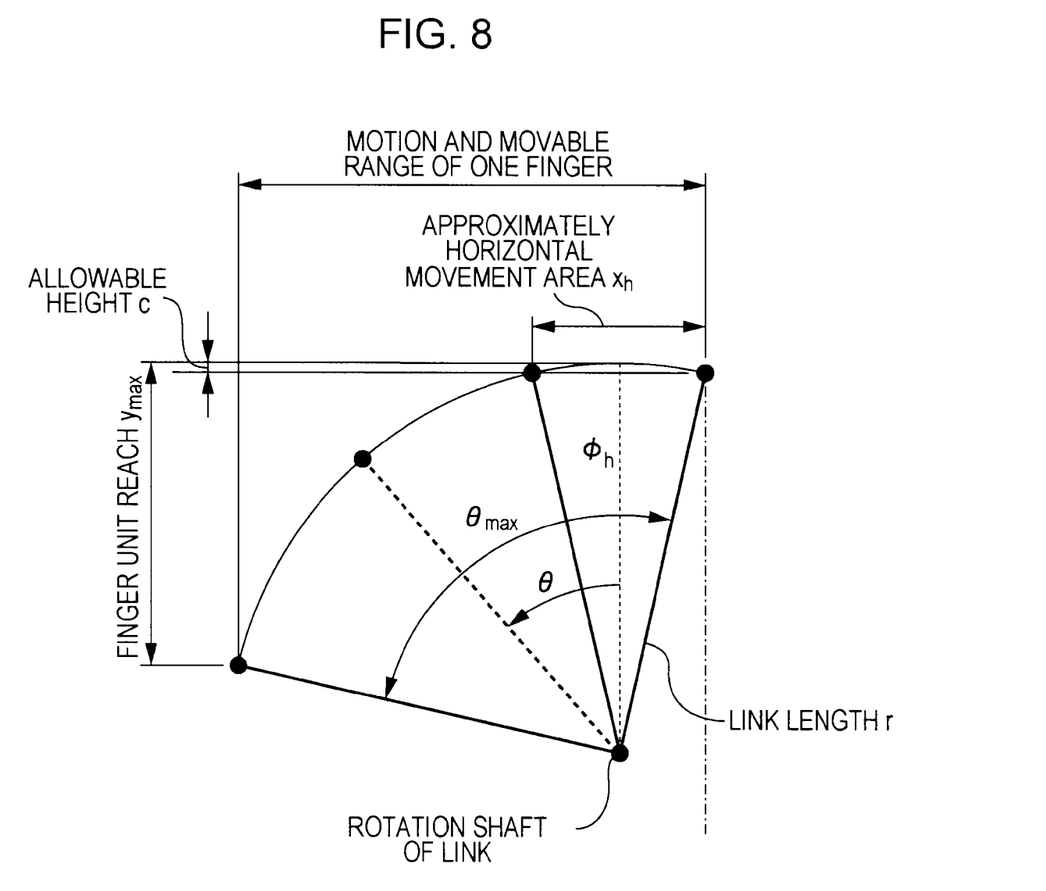
FIG. 8 shows the motion of one finger unit of the grasping apparatus and the movable range thereof.

FIG. 8 illustrates the motion of one finger unit of the grasping apparatus 1 and the movable range thereof. In FIG. 8, the maximum rotation amount of the parallel link relative to the base shaft is assumed to be $\theta_{max}$, the movement amount in the horizontal direction of the finger tip in the movable range of the parallel link is assumed to be $x_{max}$, and the reach in the vertical direction of the finger tip is assumed to be $y_{max}$. An allowable height in the vertical direction (the longitudinal direction of the finger) of variation in the finger tip above which the motion of the finger tip may not be approximated to be horizontal is assumed to be c, the amount of rotation (from the vertical position) of the parallel link is assumed to be $\phi_h$ for which the allowable height of up to c is achieved, the length of approximately horizontal movement area of the finger tip is assumed to be $x_h$. The allowable height c is equivalent to, for example, the amount of variation in the vertical direction that can be absorbed by the compliance of the articulated arm.

When the allowable height c in the vertical direction of the finger tip is determined, the length $x_h$ of the approximately horizontal movement area in which the motion of the finger tip can be approximated to be horizontal can be obtained from the link length r of the parallel link based on the following expressions (1) to (3).

$$c = r(1 - \cos \phi_h) \tag{1}$$

$$\phi_h = \cos^{-1}\left(1 - \frac{c}{r}\right) \tag{2}$$

$$x_h = 2r \sin \phi_h \tag{3}$$

The allowable height c depends on parameters such as the flexibility and rigidity of an articulated arm that has the grasping apparatus 1 according to the embodiment, the compliance for control, and the floor flexibility.

The allowable height c may be determined on the basis of the designer's experience. The allowable height c may be set mechanically by disposing a short sliding mechanism at the base of the wrist of articulated arm.

According to the expression (1) to (3) above and FIG. 8, it is sufficient to increase the allowable height c or the length r of the parallel link in order to increase the length $x_h$ of approximately horizontal movement area. However, an increase in the allowable height c results in error that causes a bend in the arm, placing burden. On the other hand, an increase in the length r of the parallel link enlarges the whole size of the grasping apparatus 1. As a result, the grasping apparatus 1 with the smaller the c/r ratio is more advantageous to keep the size of the whole grasping apparatus 1 small and the length $x_h$ of approximately horizontal movement area large. The relationship between the allowable height c and the length $x_h$ of approximately horizontal movement area with the length r of the parallel link set to be constant is shown in the following table and FIG. 9.

TABLE 1

| c | r | xh | dxh |
|---|---|----|-----|
| 0 | 1 | 0 | 28.21347 |
| 0.01 | 1 | 0.282135 | 11.58603 |
| 0.02 | 1 | 0.397995 | 8.821486 |
| 0.03 | 1 | 0.48621 | 7.379017 |
| 0.04 | 1 | 0.56 | 6.44998 |
| 0.05 | 1 | 0.6245 | 5.784908 |
| 0.06 | 1 | 0.682349 | 5.277015 |

TABLE 1-continued

| c | r | xh | dxh |
|---|---|---|---|
| 0.07 | 1 | 0.735119 | 4.871768 |
| 0.08 | 1 | 0.783837 | 4.537978 |
| 0.09 | 1 | 0.829216 | 4.256329 |
| 0.1 | 1 | 0.87178 | 4.014126 |
| 0.11 | 1 | 0.911921 | 3.802632 |
| 0.12 | 1 | 0.949947 | 3.615608 |
| 0.13 | 1 | 0.986103 | 3.448462 |
| 0.14 | 1 | 1.020588 | 3.297731 |
| 0.15 | 1 | 1.053565 | 3.160742 |
| 0.16 | 1 | 1.085173 | 3.035398 |
| 0.17 | 1 | 1.115527 | 2.920026 |
| 0.18 | 1 | 1.144727 | 2.813271 |
| 0.19 | 1 | 1.17286 | 2.714025 |
| 0.2 | 1 | 1.2 | 2.621368 |
| 0.21 | 1 | 1.226214 | 2.534534 |
| 0.22 | 1 | 1.251559 | 2.452874 |
| 0.23 | 1 | 1.276088 | 2.375837 |
| 0.24 | 1 | 1.299846 | 2.302951 |

Of the rotation area of the parallel link, the portion in which variation in the sine direction is large and variation in the cosine direction is small can be used to take the length $x_h$ of approximately horizontal movement area.

Figure 10A:
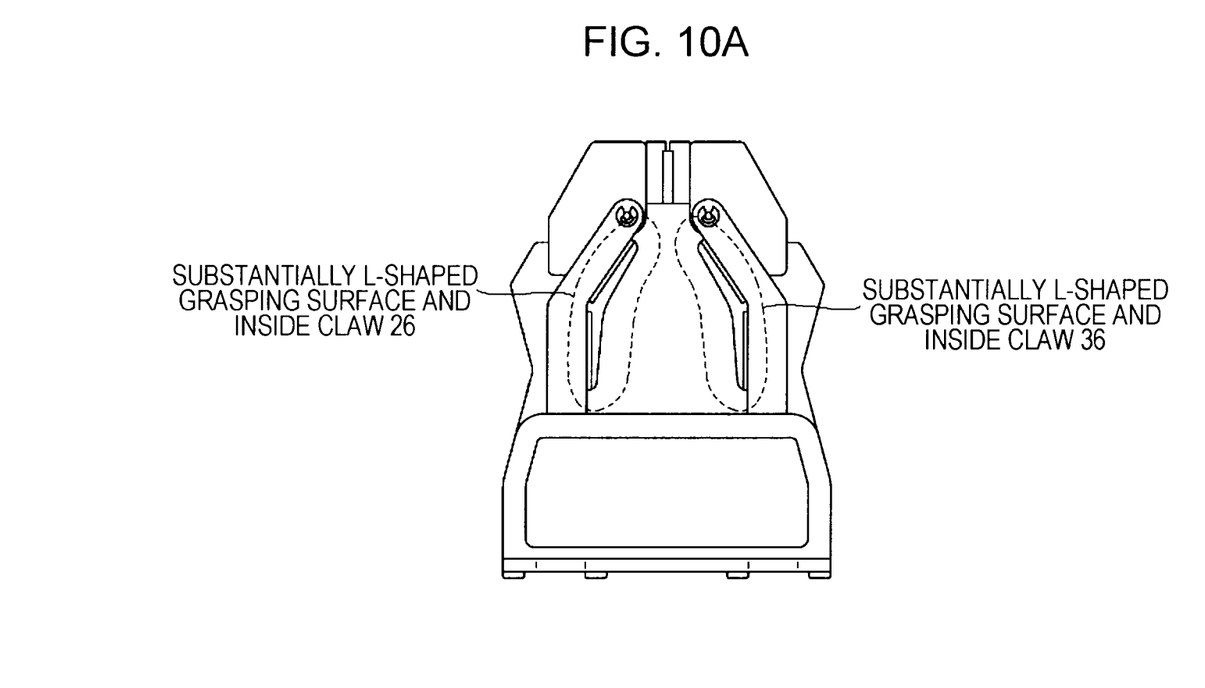
FIG. 10A shows concave grasping surfaces of the first links of the left and right parallel links on the inner side in the open/close direction and inside claws disposed along the lower edges of the grasping surfaces.

In the present embodiment, each of the first links 22 and 32 of the left and right parallel links 20 and 30 is substantially L-shaped with a concave portion disposed on the inner side in the open/close direction, viewed from the top (see FIG. 10A). Besides clamping a physical object with the grasping surfaces of the left and right finger units 25 and 35, the grasping apparatus 1 can grasp a relatively large object safely using the substantially L-shaped concave portions on the inner sides of the first links 22 and 32.

Figure 10B:
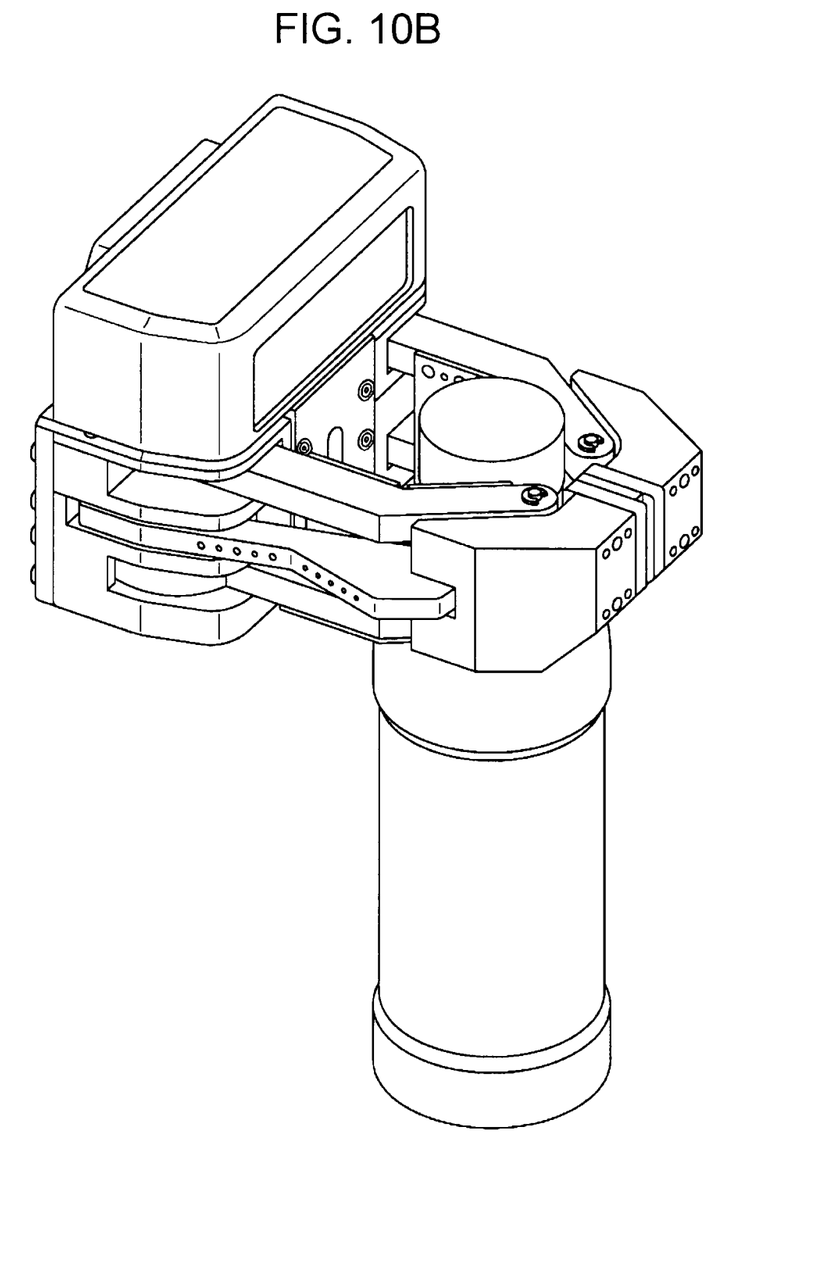
FIG. 10B shows how the concave grasping surfaces on the inner side in the open/close direction of the left and right parallel links are used to grasp the neck of a pet bottle.

The inside claws 26 and 36 are disposed along a lower edge on the inner side of the first links 22 and 32 of the left and right parallel links 20 and 30 (see FIG. 10A). When a constricted physical object is grasped by the substantially L-shaped concave portions on the inner sides of the left and right first links 22 and 32, the inside claws 26 and 36 mates with the constriction so that the physical object can be grasped safely. An example of the physical object and the constriction is a PET bottle and its constriction (see FIG. 10B).

The inside claws 26 and 36 are made of a polyurethane material with a Shore A hardness of 70 to 90, which improves flexibility and durability and supports a heavy object (see FIG. 10A). The grasping surfaces on the inner sides in the open/close direction of the first links 22 and 32 have, for example, sponge stoppers thereon. The combination of the sponge stoppers and the inside claws 26 and 36 achieves high grasping performance (see FIG. 10B).

Each of the first links 22 and 32 of the left and right parallel links 20 and 30 includes two link members superimposed in the shaft direction of the base shafts 21 and 31. Each of the second links 24 and 34 of the left and right parallel links 20 and 30 includes one link member inserted into the space between the two link members of the first links 22 and 32 (described earlier).

The grasping operation using approximately horizontal movement area of the finger units 25 and 35, shown in FIGS. 7A to 7E, is positioned as operation using translational driving of the parallel links 20 and 30. On the other hand, the grasping operation using the substantially L-shaped concave portions on the inner sides of the left and right first links 22 and 32 is positioned as operation using rotary driving of the parallel links 20 and 30. Therefore, the grasping apparatus 1 according to the present embodiment can perform various types of grasping operation by using translational driving and rotary driving, which are performed by moving the left and right parallel links 20 and 30 together via the actuator 11, which is one power source. Depending on the shape and size of a physical object to be grasped, one of these driving methods may be used as appropriate.

The grasping apparatus 1 according to the present embodiment further includes a sensor that senses the grasping force applied when a physical object is grasped by the left and right parallel links 20 and 30. The following three examples will be described as methods of sensing the grasping force applied when two types of grasping operation using translational driving and rotary driving of the parallel links 20 and 30 are performed.

(1) A strain gage is installed at the base of at least one of the left and right first link units 22 and 32 or at the base of at least one of the left and right finger units 25 and 35. The grasping force is sensed by measuring the amount of strain indicated by the strain gage when a physical object is grasped.

(2) A pressure-conductive rubber sheet, pressure sensor, etc. is attached to (the grasping surfaces of) the left and right finger units 25 and 35 so that the grasping force can be sensed according to the sensor output.

(3) The grasping force is sensed according to the current value output from the actuator 11 when a physical object is grasped.

The strain gage includes a resistor whose resistance varies depending on the amount of deformation of the resistor. In method (1) above, the measured amount of deformation of the strain gage is converted into a grasping force.

A pressure-conductive rubber sheet includes rubber containing metal powder and the resistance varies depending on the amount of deformation during application of a force. In method (2) above, the measured amount of deformation of the conductive rubber sheet is converted into a grasping force.

There are various types of pressure sensors: a capacitive pressure sensor, optical pressure sensor, and magnetic pressure sensor. The capacitive sensor includes two mutually facing electrostatic plates. When a force is applied to one electrostatic plate, the distance between these plates reduces and the capacitance changes. In method (3) above, the measured amount of change in capacitance is converted into a grasping force.

The optical pressure sensor includes a light-emitting element and light-receiving element. A light path between the light-emitting side and the light-receiving side is blocked by application of a force and the amount of light received changes. In method (3) above, change in the measured amount of light received is converted into a grasping force. Alternatively, the distance between the light-emitting side and the light-receiving side is changed by application of a force. In method (3) above, the amount of change in the distance is converted into grasping force.

The magnetic pressure sensor includes magnetic material whose magnetic field amount varies depending on deformation. In method (3) above, the measured amount of change in magnetic field is converted into a grasping force.

Figure 10C:
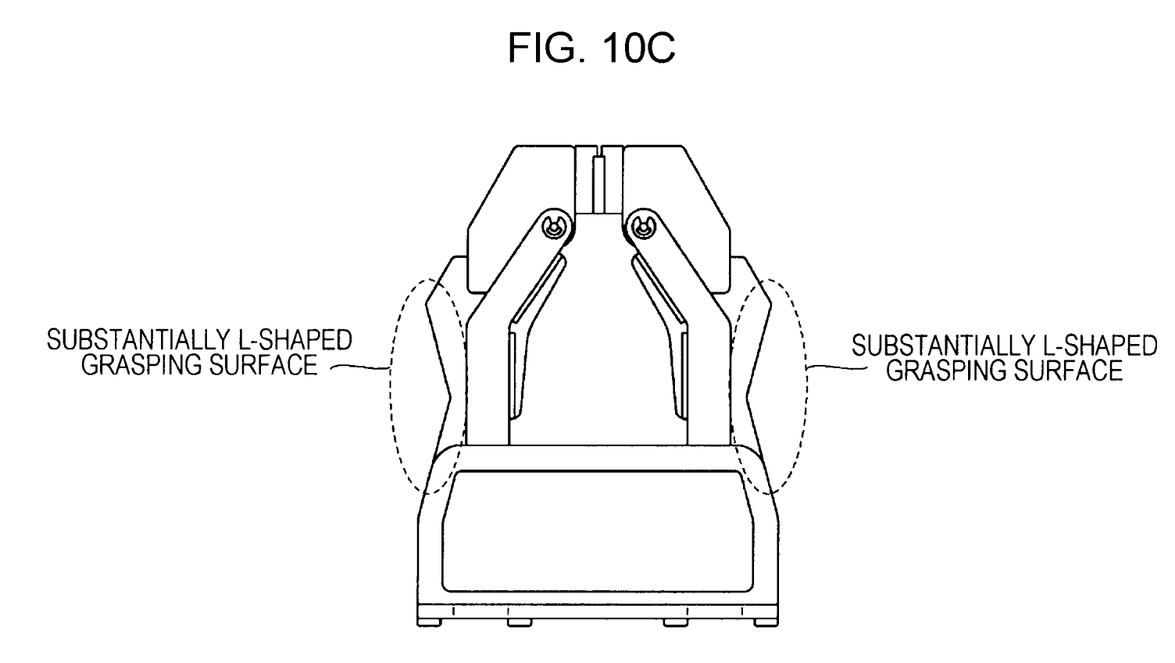
FIG. 10C shows the grasping surfaces of the second links of the left and right parallel links, the concave grasping surfaces on an outer side in the open/close direction.

Each of the second links 24 and 34 of the left and right parallel links 20 and 30 is substantially L-shaped with a concave portion disposed on the outer side, viewed from the top. This concave portion can be used as a grasping surface (see FIG. 10C). The grasping surface has, for example, a sponge stopper thereon. The combination of the sponge stopper and the claw achieves high grasping performance (see FIG. 10C). In a robot or other machine including a plurality of pairs of articulated arms each having the grasping apparatus 1 of the present embodiment, it is also possible to use the substantially L-shaped concave portions of two mutually facing second parallel links of two adjacent arms for safely grasping a physical object.

Figure 9:
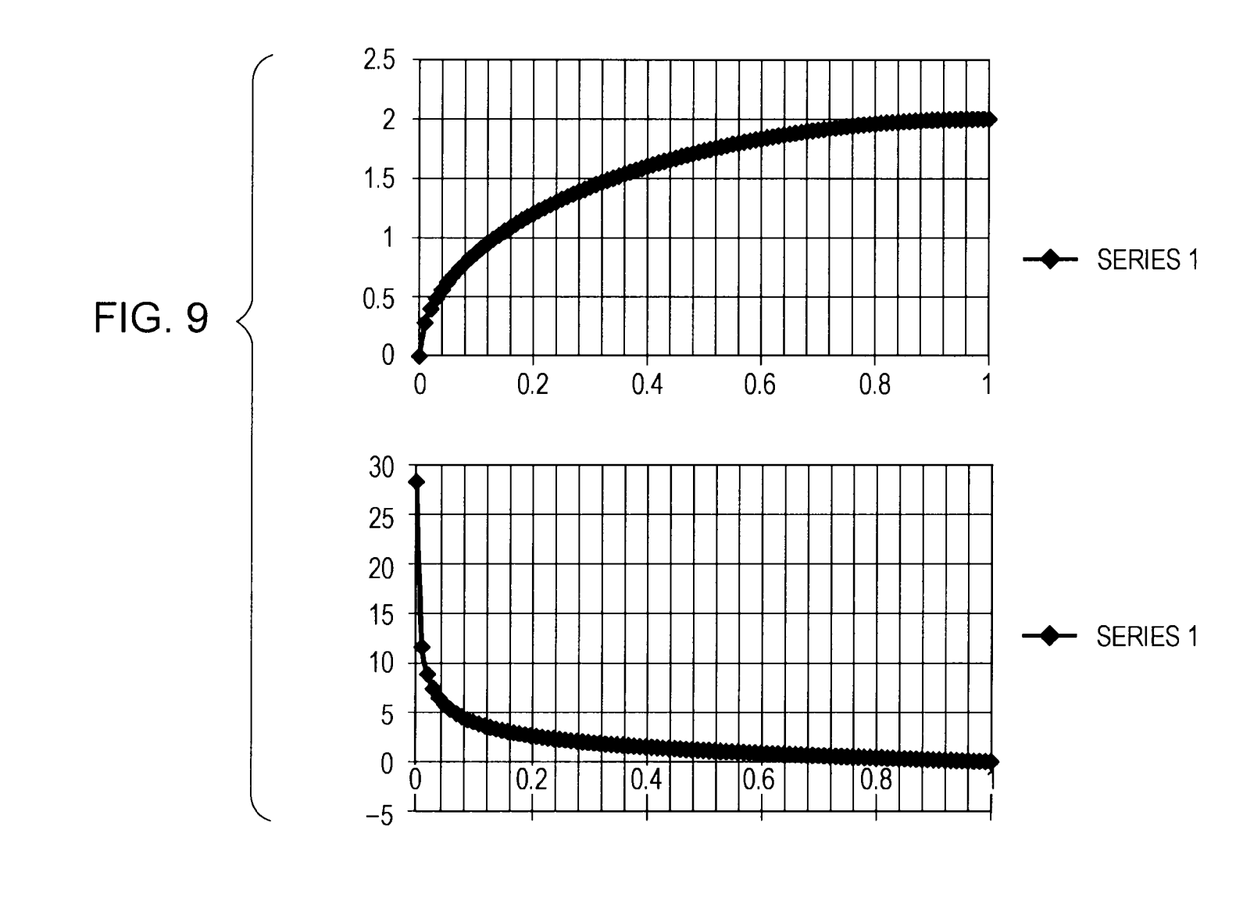
FIG. 9 indicates the relationship between the allowable height c and the length $x_h$ of an approximately horizontal movement area where the length r of the left and right parallel links is constant.

As shown in FIG. 9, in the grasping apparatus 1 according to the present invention, the maximum rotation amount of each of the left and right parallel links 20 and 30 is defined as $\theta_{max}$, but the maximum rotation amount is not limited to a specific angle. However, it is easily inferred that, if the left and right parallel links 20 and 30 mutually open beyond a certain angle, the grasping surfaces of the left and right finger units 25 and 35 do not face each other or substantially L-shaped concave portions on the inner side of the first links 22 and 32 do not face each other and grasping performance is lost.

Figure 11:
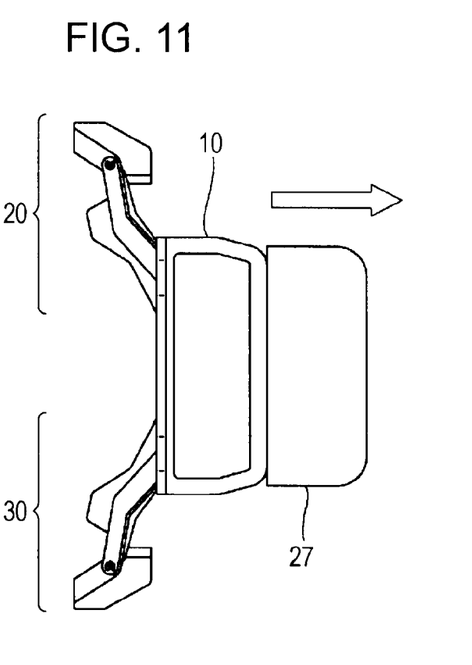
FIG. 11 shows the ejection of a slider from the base unit when the left and right parallel links open sufficiently.
Figure 12:
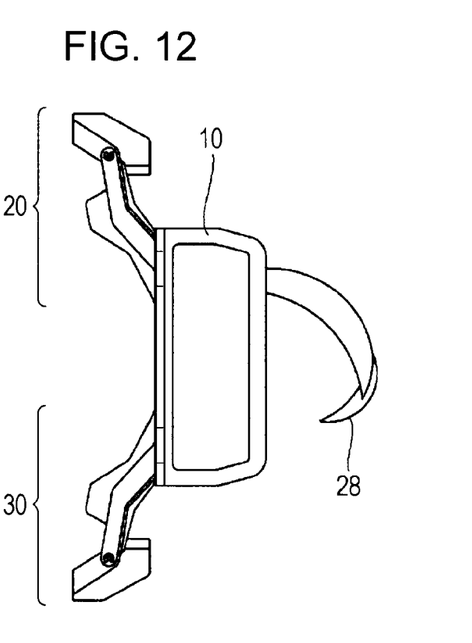
FIG. 12 shows the ejection of a hook from the base unit when the left and right parallel links open sufficiently.

In the grasping apparatus 1 according to the present embodiment, a modification can be proposed, in which, if the left and right parallel links 20 and 30 open sufficiently, a hook or a slider 27 that can be used as a tray appears from the base unit 10. FIG. 11 shows the ejection of the slider 27 from the base unit 10 when the left and right parallel links 20 and 30 open sufficiently. FIG. 12 shows the ejection of a hook 28 from the base unit 10 when the left and right parallel links 20 and 30 open sufficiently. The slider 27 can be used to capture fine particles or intangibles such as tablets or powder collectively. Also, the hook 28 can be used to hang a flexible object such as clothing.

The slider 27 or hook 28 shown in the drawings is configured so as to eject from or retract into the base unit 10 depending on whether the left and right parallel links 20 and 30 are open or closed. The ejection or retraction of such components is achieved by an existing interlocking mechanism. In the range of angles at which a physical object is grasped by the left and right finger units 25 and 35 or by the substantially L-shaped concave portions on the inner side of the first links 22 and 32, the slider 27 and the hook 28 are in the base unit 10, so an interference with the above grasping operation by the left and right parallel links 20 and 30 does not occur.

The present application contains subject matter related to that disclosed in Japanese Priority Patent Application JP 2009-293796 filed in the Japan Patent Office on Dec. 25, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A grasping apparatus comprising:
   a base unit;
   left and right parallel links each including,
      a first link attached pivotably to a base shaft of the base unit, and configured to pivot in a first direction and a second direction,
      a second link attached pivotably to an auxiliary shaft that is not co-linear to the base shaft of the base unit, and configured to pivot in the first direction and the second direction,
      a finger unit supported pivotably at an end of the first link and an end of the second link and including a grasping surface, the left and right parallel links being substantially symmetrical to each other, and
      a claw that projects at an obtuse angle with respect to and along a first edge of the grasping surface of the finger unit, and configured to guide an object toward the grasping surface of the finger unit; and
   a driving unit that is housed in the base unit and is configured to drive the first links of the left and right parallel links in the first direction and the second direction, wherein
   the grasping surfaces of the left and right parallel links face each other.

2. The grasping apparatus according to claim 1, wherein the driving unit includes an actuator and a transmission unit that evenly transmits rotation by the actuator to the base shaft of each of the left and right parallel links.

3. The grasping apparatus according to claim 2, wherein the transmission unit includes a gear train to which a non-backlash gear is applied in a final stage for driving the base shaft of one of the left and right parallel links.

4. The grasping apparatus according to claim 1, wherein the finger unit and the claw of each of the left and right parallel links include high molecular compounds.

5. The grasping apparatus according to claim 1, wherein the grasping surface of the finger unit of each of the left and right parallel links has a stopper of copolymer form.

6. The grasping apparatus according to claim 1, wherein each of the left and right parallel links has a rotation area in which a tip of the finger unit of the respective one of the left and right parallel links draws a substantially arc path according to rotation of the first and second links of the respective one of the left and right parallel links and an approximately horizontal movement area in which motion of the tip of the finger unit of the respective one of the left and right parallel links can be approximated to be horizontal.

7. The grasping apparatus according to claim 6, wherein a length of the approximately horizontal movement area of the respective one of the left and right parallel links is determined on the basis of a relationship between lengths of the first and second links of the respective one of the left and right parallel links and an allowable height within which the tip of the finger unit of the respective one of the left and right parallel links is allowed to move vertically in the approximately horizontal movement area.

8. The grasping apparatus according to claim 1, wherein the first link of each of the left and right parallel links has a concave grasping surface on a side facing the other of the left and right parallel links.

9. The grasping apparatus according to claim 8, wherein each of the left and right parallel links include an inside claw that projects toward the inside claw of the other of the left and right parallel links, and
   the left and right inside claws are disposed along second edges of the first links of the left and right parallel links.

10. The grasping apparatus according to claim 9, wherein the left and right inside claws include high molecular compounds and the grasping surface of the first link of each of the left and right parallel links includes a stopper of copolymer foam.

11. The grasping apparatus according to claim 1, wherein the second link of each of the left and right parallel links has a concave grasping surface on a side facing away from the other of the left and right parallel links.

12. The grasping apparatus according to claim 1, further comprising a sensing means for sensing a grasping force applied to grasp a physical object using the left and right parallel links.

13. The grasping apparatus according to claim 1, wherein at least a portion of each of the claws is configured to slide between the object and a surface on which the object rests.

* * * * *